US012761891B2

(12) United States Patent
Arakkal et al.

(10) Patent No.: US 12,761,891 B2
(45) Date of Patent: Oct. 13, 2026

(54) AUTOMATED FIRMWARE UPDATES BASED ON DEVICE DRIVER VERSION IN A SERVER DEVICE

(71) Applicant: Dell Products L.P., Round Rock, TX (US)

(72) Inventors: Rajeev Arakkal, Kerala (IN); Santosh Gore, Bangalore (IN); Abhijeet Bhattacharya, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 17/564,698

(22) Filed: Dec. 29, 2021

(65) Prior Publication Data

US 2023/0205508 A1 Jun. 29, 2023

(51) Int. Cl.
*G06F 9/44* (2018.01)
*G06F 8/65* (2018.01)

(52) U.S. Cl.
CPC .................................... *G06F 8/65* (2013.01)

(58) Field of Classification Search
CPC ..... G06F 8/65; G06F 8/70; G06F 8/71; G06F 8/61; G06F 8/77; G06F 3/123; G06F 3/1225; G06F 8/60; G06F 9/44536; G06F 21/572
USPC .................................................. 717/168–178
See application file for complete search history.

(56) References Cited

U.S. PATENT DOCUMENTS

| | | | | |
|---|---|---|---|---|
| 6,607,314 | B1 * | 8/2003 | McCannon | G06F 3/1204 400/62 |
| 10,922,068 | B1 * | 2/2021 | Radjabi | G06F 13/4221 |
| 2011/0131447 | A1 * | 6/2011 | Prakash | G06F 9/4408 713/189 |
| 2017/0269978 | A1 * | 9/2017 | Engel | G06F 9/541 |
| 2020/0257517 | A1 * | 8/2020 | Seater | G06F 1/3206 |

OTHER PUBLICATIONS

"Automate firmware updates, saving time, money, and your sanity!", https://www.cio.com/article/201931/automate-firmware-updates-saving-time-money-and-your-sanity.html, Brand Post sponsored by HPE, Jan. 27, 2020, downloaded on Dec. 23, 2021.

(Continued)

*Primary Examiner* — Chuck O Kendall
(74) *Attorney, Agent, or Firm* — Ryan, Mason & Lewis, LLP

(57) ABSTRACT

Techniques are provided for automatically updating one or more firmware versions based on corresponding device driver versions of a server device. One method comprises, in response to an update of a device driver of a server device: obtaining, by the server device, a driver version of the device driver; identifying, using firmware mapping data structures, a firmware version of firmware of the server device associated with (e.g., compatible with) the obtained driver version; and updating the firmware to correspond to the identified firmware version from the firmware mapping data structures. The driver version may be obtained from: (i) a host agent associated with an operating system of the server device, and/or (ii) a memory of the server device, after being stored in the memory in response to: a loading of the device driver from the operating system and/or the update of the device driver.

20 Claims, 8 Drawing Sheets

(56) References Cited

OTHER PUBLICATIONS

"A simple, secure way to automate firmware update of your switches, routers and firewalls", https://blogs.manageengine.com/network/deviceexpert/2011/05/30/a-simple-secure-way-to-automate-firmware-update-of-your-switches-routers-firewalls.html, Device Experts, May 30, 2011, downloaded on Dec. 23, 2021.

"Tools and Techniques for Updating Enterprise Firmware", https://eclypsium.com/2020/05/14/tools-and-techniques-for-updating-enterprise-firmware/, Eclypsium, May 14, 2020, downloaded on Dec. 23, 2021.

Yothment, Jacob; "Firmware vs. Software: Understanding the Distinctions"; https://blog.purestorage.com/purely-educational/firmware-vs-software-understanding-the-distinctions/#:~:text=Drivers%20are%20software%20components%20that,include%20drivers%20within%20its%20code; Jul. 5, 2023.

* cited by examiner

AUTOMATED FIRMWARE UPDATES BASED ON DEVICE DRIVER VERSION IN A SERVER DEVICE

FIELD

The field relates generally to information processing systems, and more particularly to the maintenance of such information processing systems.

BACKGROUND

A computing device typically comprises hardware, software and firmware. Firmware comprises software that provides specific instructions to one or more hardware devices associated with a computing device. Device drivers comprise a specified set of application programming interfaces (APIs) and other features to communicate with corresponding features in the firmware. Any incompatibilities between the device drivers and the respective firmware may cause a malfunction or another problem in the computing device.

SUMMARY

In one embodiment, a method comprises, in response to an update of at least one device driver of a server device: obtaining, by the server device, a driver version of the at least one device driver of the server device; identifying, using one or more firmware mapping data structures, at least one firmware version of firmware of the server device associated with the obtained driver version; and updating the firmware to correspond to at least one of the identified at least one firmware version from the one or more firmware mapping data structures.

In some embodiments, the identifying the at least one firmware version associated with the obtained driver version further comprises obtaining the at least one firmware version that is compatible with the obtained driver version. The obtained driver version may be obtained from a host agent associated with an operating system of the server device. The host agent may subscribe to operating system events related to updates of the at least one device driver, and the update of the at least one device driver may generate a notification of the update to the host agent.

In at least one embodiment, the obtained driver version is obtained from a memory of the server device, and wherein the obtained driver version is stored in the memory of the server device in response to one or more of a loading of the at least one device driver from the operating system and the update of the at least one device driver.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automatically updating one or more firmware versions based on corresponding device driver versions of a server device.

In some embodiments, the disclosed techniques for automated firmware updates maintain compatibility between device drivers and their respective firmware and thereby avoid (or reduce) malfunctions and other problems associated with a given computing device. For example, the disclosed firmware update techniques can detect when an outdated firmware version is not compatible with an updated device driver.

Figure 1:
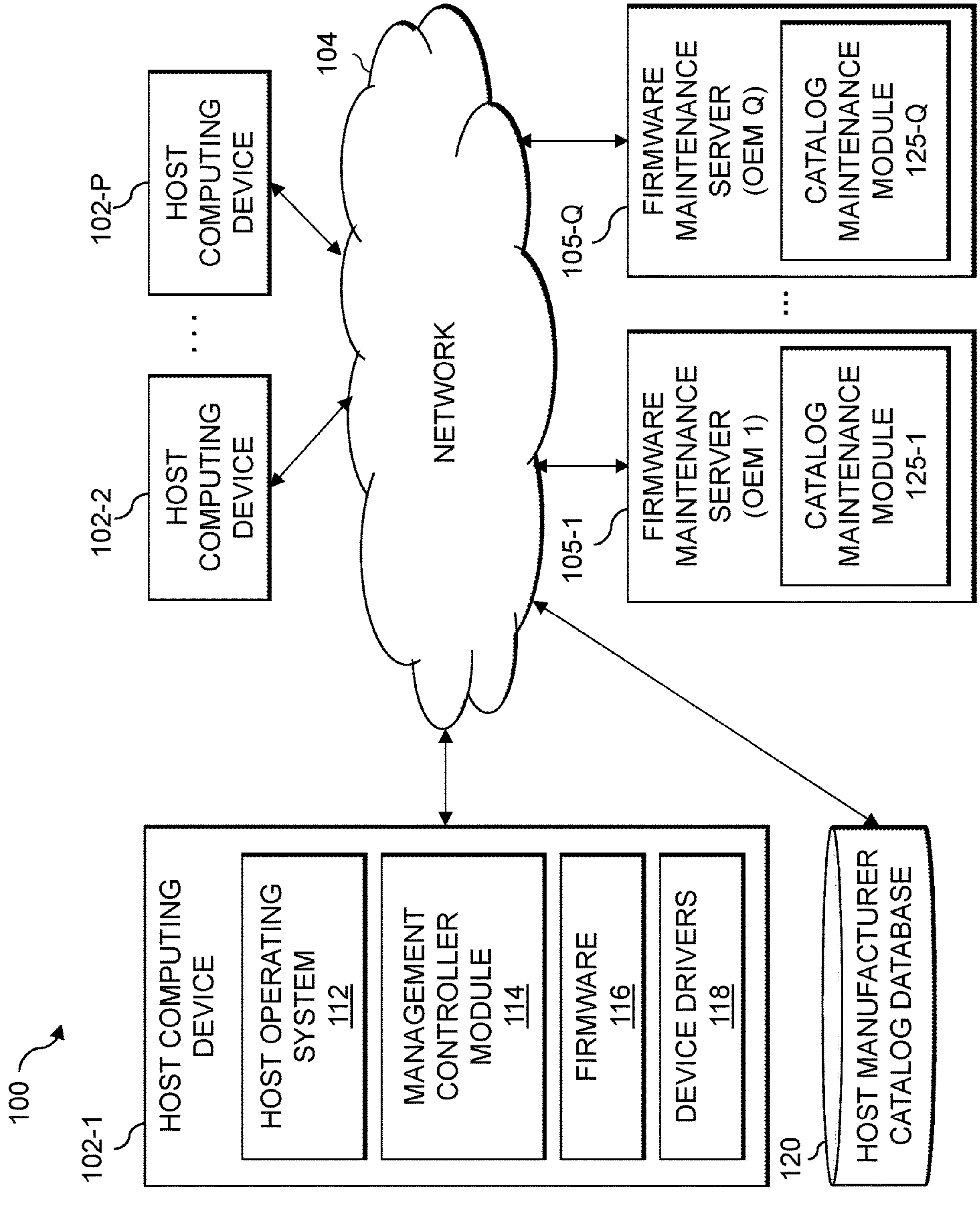
FIG. 1 illustrates an information processing system configured for automatically updating one or more firmware versions based on corresponding device driver versions of a server device in accordance with an illustrative embodiment.

FIG. 1 shows a computer network (also referred to herein as an information processing system) 100 configured in accordance with an illustrative embodiment. The computer network 100 comprises a plurality of host computing devices 102-1 through 102-P, collectively referred to herein as host computing devices 102. The host computing devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a plurality of firmware maintenance servers 105-1 through 105-Q, discussed below, where each firmware maintenance server 105 is associated with a different, corresponding original equipment manufacturer (OEM) in the example of FIG. 1.

The host computing devices 102 may comprise, for example, server devices or other types of computers of an enterprise computer system, cloud-based computer system or other arrangement of multiple compute nodes associated with respective users. Such devices are examples of what are more generally referred to herein as "processing devices." Some of these processing devices are also generally referred to herein as "computers." The host computing devices 102 may comprise a network client that includes networking capabilities such as ethernet, Wi-Fi, etc.

For example, the host computing devices 102 in some embodiments illustratively provide compute services such as execution of one or more applications on behalf of each of one or more users associated with respective ones of the host computing devices 102. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The host computing devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

In the example of FIG. 1, the exemplary host computing device 102-1 comprises a host operating system 112, a management controller module 114, firmware 116 and one or more device drivers 118. As discussed further below, the firmware 116 may be implemented, for example, as non-volatile memory (NVM) subsystem (firmware), a BIOS (basic input/output system), a TPM (Trusted Platform Module), or another cryptographic module, and/or a CEC/CPC (Central Electronics Complex/Central Processor Complex) chip.

It is to be appreciated that this particular arrangement of elements 112, 114, 116 and 118 illustrated in the host computing device 102-1 of the FIG. 1 embodiment is presented by way of example only, and alternative arrangements can be used in other embodiments. For example, the functionality associated with elements 112, 114, 116 and 118 in other embodiments can be implemented as a single element or device, or separated across a larger number of elements. As another example, multiple distinct processors can be used to implement different ones of elements 112, 114, 116 and 118, or portions thereof.

At least portions of elements 112, 114, 116 and 118 may be implemented at least in part in the form of software that is stored in memory and executed by a processor. An exemplary process utilizing elements 112, 114, 116 and 118 of an example host computing device 102-1 in computer network 100 will be described in more detail with reference to the flow diagrams of, for example, FIGS. 3A and 3B.

It is to be appreciated that the term "user" as used herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Additionally, one or more of the host computing devices 102 can have one or more associated host manufacturer catalog databases 120 configured to store, for example, a firmware catalog comprising a mapping of a latest version of each device driver used in the respective host computing device 102 to a corresponding version of firmware that should be employed. In some embodiments, the firmware catalog may comprise a mapping one or more versions of each device driver to one or more corresponding compatible versions of firmware. The term "firmware catalog" as used herein is intended to be broadly construed so as to encompass, for example, any mapping between one or more versions of at least one device driver and one or more versions of corresponding firmware, and should not be viewed as being limited to any particular exemplary implementation described herein. The host manufacturer catalog database 120 may be accessed by the disclosed techniques for firmware update. Typically, manufacturers and/or vendors of the host computing devices 102 publish such a catalog.

The databases can be implemented using one or more storage systems associated with the respective host computing devices 102. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The storage devices in such storage systems illustratively comprise solid state drives (SSDs). Such SSDs are implemented using NVM devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

The host computing devices 102 and/or the firmware maintenance servers 105 may be implemented on a common processing platform, or on separate processing platforms. The host computing devices 102 (for example, when implemented as host devices) are illustratively configured to write data to and read data to/from a storage system in accordance with applications executing on those host devices for system users.

One or more of the host computing devices 102 and/or the firmware maintenance servers 105 may be implemented, for example, on the cloud or on the premises of an enterprise or another entity. In some embodiments, the firmware maintenance server 105, or portions thereof, may be implemented as part of a storage system or on a host device.

As also depicted in FIG. 1, the exemplary firmware maintenance servers 105 further comprise respective catalog maintenance modules 125-1 through 125-Q. In some embodiments, the catalog maintenance modules 125 may be employed to update the host manufacturer catalog database 120 of the host computing devices 102, for example, using the OEM defined PLDM (Platform Level Data Model). The PLDM monitoring and control specification defines messages and data structures for discovering, describing, initializing, and accessing sensors and other elements within the management controllers and management devices of a platform management subsystem.

The host computing devices 102 are configured to interact over the network 104 with the firmware maintenance servers 105 and/or storage devices. Such interaction illustratively includes generating IO operations, such as write and read requests, and sending such requests over the network 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host computing devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the host computing devices 102 can be one or more IO devices (not shown), which illustratively comprise keyboards, displays or other types of IO devices in any combination. Such IO devices can be used, for example, to support one or more user interfaces to the host computing devices 102, as well as to support communication between the host computing devices 102 and other related systems and devices not explicitly shown.

The host computing devices 102 and the firmware maintenance servers 105 in the FIG. 1 embodiment are assumed to be implemented using at least one processing device. Each such processing device generally comprises at least one processor and an associated memory, and implements one or more functional modules for controlling certain features of the firmware maintenance server 105.

More particularly, host computing devices 102 and firmware maintenance servers 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

A network interface allows the host computing devices 102 and/or the firmware maintenance servers 105 to communicate over the network 104 with each other (as well as one or more other networked devices), and illustratively comprises one or more conventional transceivers.

It is to be understood that the particular set of elements shown in FIG. 1 for automated firmware updates is presented by way of illustrative example only, and in other embodiments additional or alternative elements may be used. Thus, another embodiment includes additional or alternative systems, devices and other network entities, as well as different arrangements of modules and other components.

In one embodiment of the disclosure, as discussed further below in conjunction with FIGS. 2A and 3A, an agentless method is provided for automatically updating one or more firmware versions based on the corresponding device driver version of a server device. When a device driver is updated (including being loaded from the operating system), the driver version is updated to the memory of the respective host computing device 102. The driver version is then obtained from memory and used to identify the one or more firmware versions that are compatible with the stored driver version from the respective host manufacturer catalog database 120.

In another embodiment of the disclosure, as discussed further below in conjunction with FIGS. 2B and 3B, an agent-based method is provided for automatically updating one or more firmware versions based on the corresponding device driver version of a server device. When a device driver is updated (including being loaded from the operating system), an agent that has subscribed to such events gets notified of the driver version associated with the driver update. The indicated driver version is then used to identify the one or more firmware versions that are compatible with the indicated driver version from the respective host manufacturer catalog database 120.

Figure 2A:
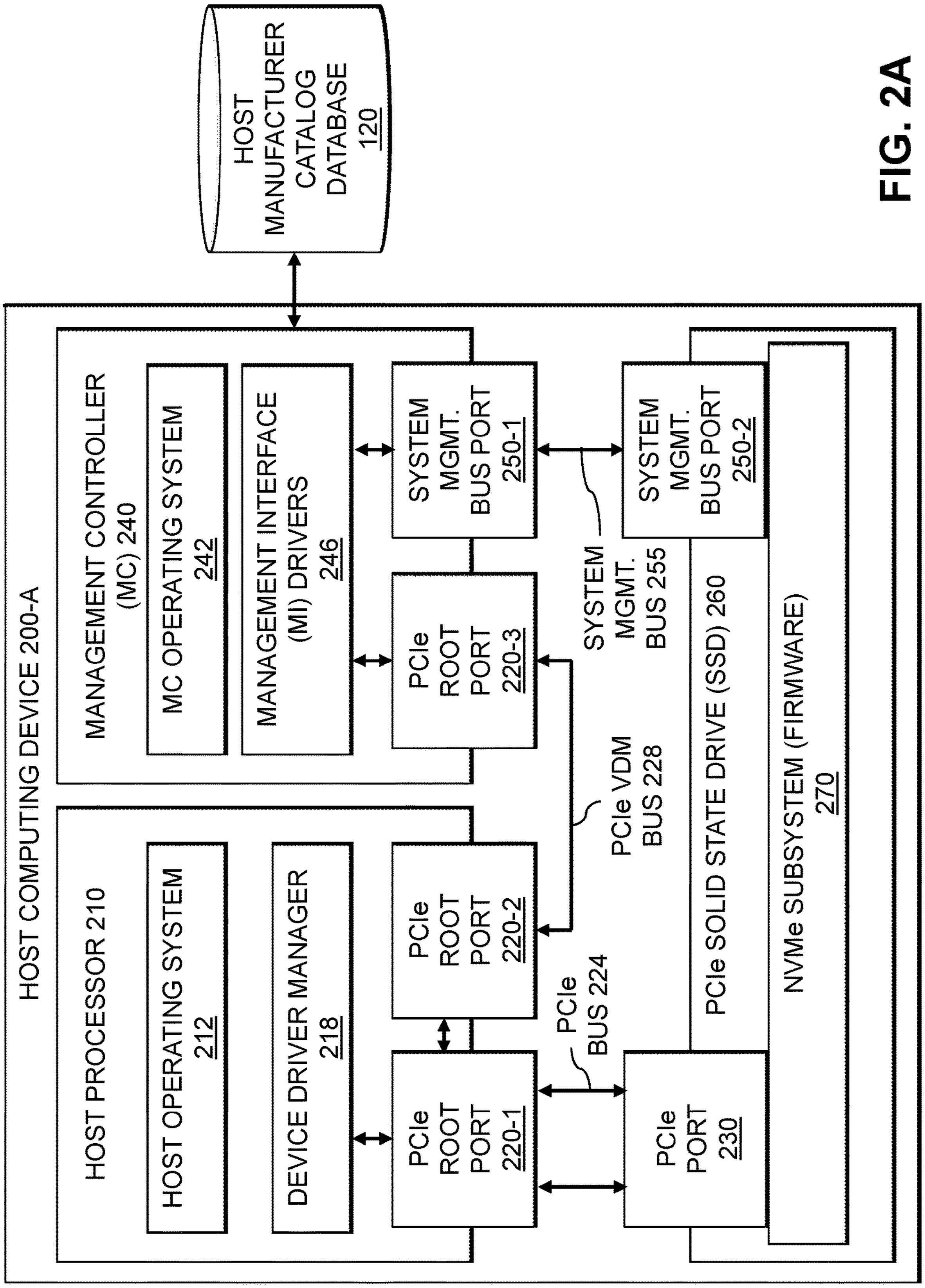
FIGS. 2A and 2B illustrate exemplary host computing devices of FIG. 1 in further detail in accordance with some illustrative embodiments.

FIG. 2A illustrates an exemplary host computing device 200-A using an agentless approach for automated firmware updates in accordance with an illustrative embodiment. In the example of FIG. 2A, the exemplary host computing device 200-A comprises a host processor 210, a management controller (MC) 240 and a PCIe (Peripheral Component Interconnect Express) SSD 260. The host computing device 200-A interacts with the host manufacturer catalog database 120 of FIG. 1 to obtain catalog results, for example, upon an update of a device driver, as discussed further below in conjunction with FIG. 3A.

In the example of FIG. 2A, the host processor 210 comprises a host operating system 212 and a device driver manager 218 that comprises and manages one or more device drivers, such as an NVMe device driver (not specifically shown in FIG. 2A). In addition, the host processor 210 comprises two PCIe root ports 220-1 and 220-2 for communicating with a PCIe port 230 of the PCIe SSD 260 and a PCIe root port 220-3 of the management controller 240, respectively. The PCIe root port 220-1 communicates with the PCIe port 230 of the PCIe SSD 260 using a PCIe bus 224. The PCIe root port 220-2 communicates with the PCIe root port 220-3 of the management controller 240 using a PCIe VDM (Vendor Defined Message) bus 228 that channelizes the information to the management controller 240.

In one or more embodiments, the exemplary management controller 240 further comprises an MC operating system 242 and one or more management interface (MI) drivers 246, such as an NVMe-MI driver (not specifically shown in FIG. 2A). The management interface drivers 246 each comprise a command set and architecture for managing respective firmware, such as NVMe firmware, to discover, monitor, configure, and update firmware in multiple operating environments.

The exemplary management controller 240 also comprises a system management bus port 250-1 that communicates with a system management bus port 250-2 of the PCIe SSD 260 using a system management bus 255 based on a serial communication protocol. The management controller 240 may be implemented, for example, as a baseboard management controller (BMC), such as the Integrated Dell Remote Access Controller (iDRAC), commercially available from Dell Technologies, or another out of band (OOB) controller.

The exemplary PCIe SSD 260 is one example of a component of the exemplary host computing device 200-A comprising firmware. As shown in the example of FIG. 2A, the PCIe SSD 260 further comprises an NVMe subsystem 270 as an example of firmware that is updated in accordance with the disclosed techniques for automatically updating one or more firmware versions based on a corresponding device driver version of a server device.

Figure 2B:
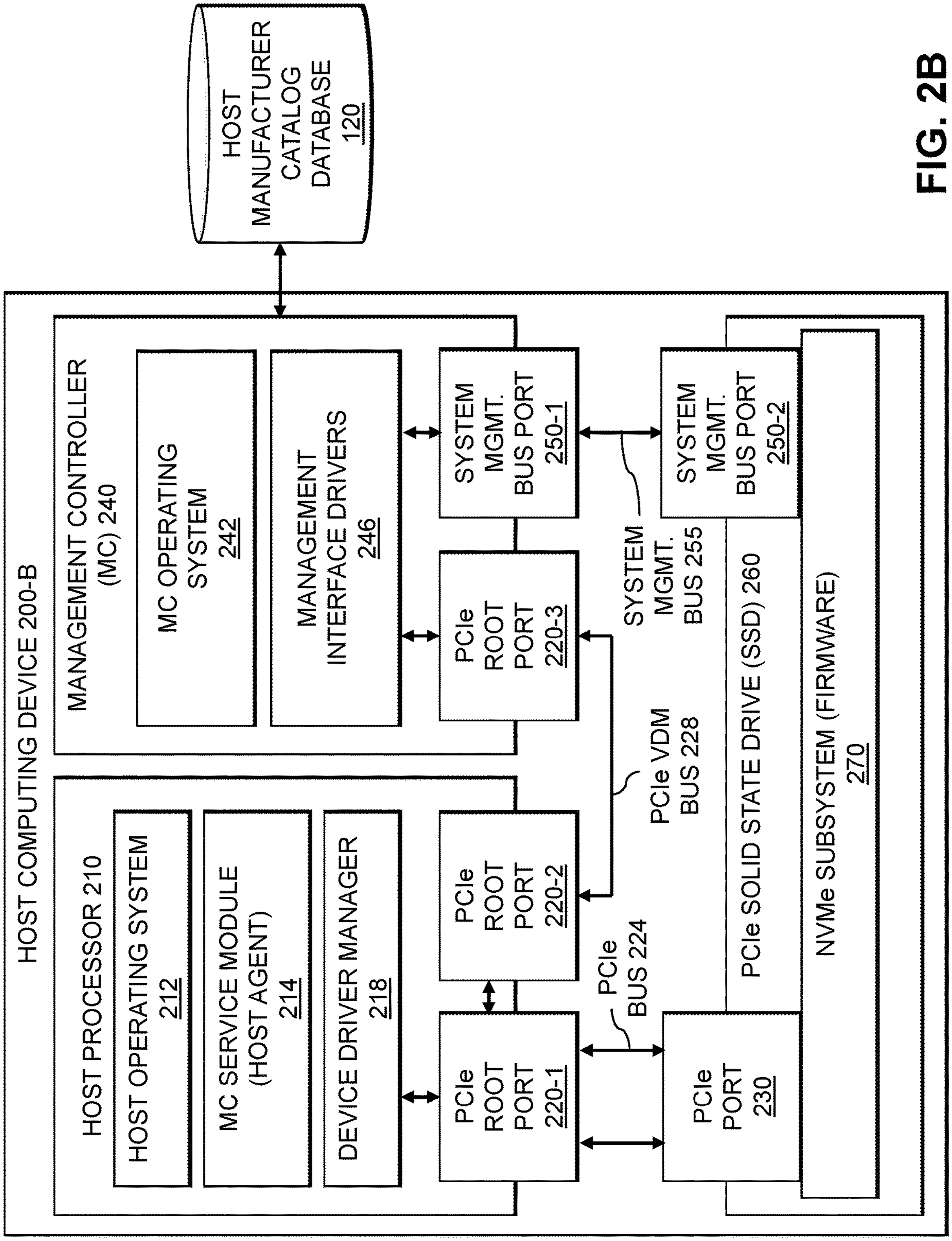

FIG. 2B illustrates an exemplary host computing device 200-B using an agent-based approach for automated firmware updates in accordance with another illustrative embodiment. The exemplary host computing device 200-B is implemented in a similar manner as the exemplary host computing device 200-A of FIG. 2A, where like label numbers are used to indicate substantially similar elements.

In the example of FIG. 2B, the exemplary host computing device 200-B further comprises an MC service module 214 as a host agent to interact with the management controller 240. As discussed further below in conjunction with FIG. 3B, the exemplary MC service module 214 performs the agent-based functionality for automatically updating one or more firmware versions based on a corresponding device driver version of the host computing device 200-B. The exemplary MC service module 214 may be implemented, for example, as a Windows Admin Center (WAC) or an iDRAC service module (iSM).

Figure 3A:
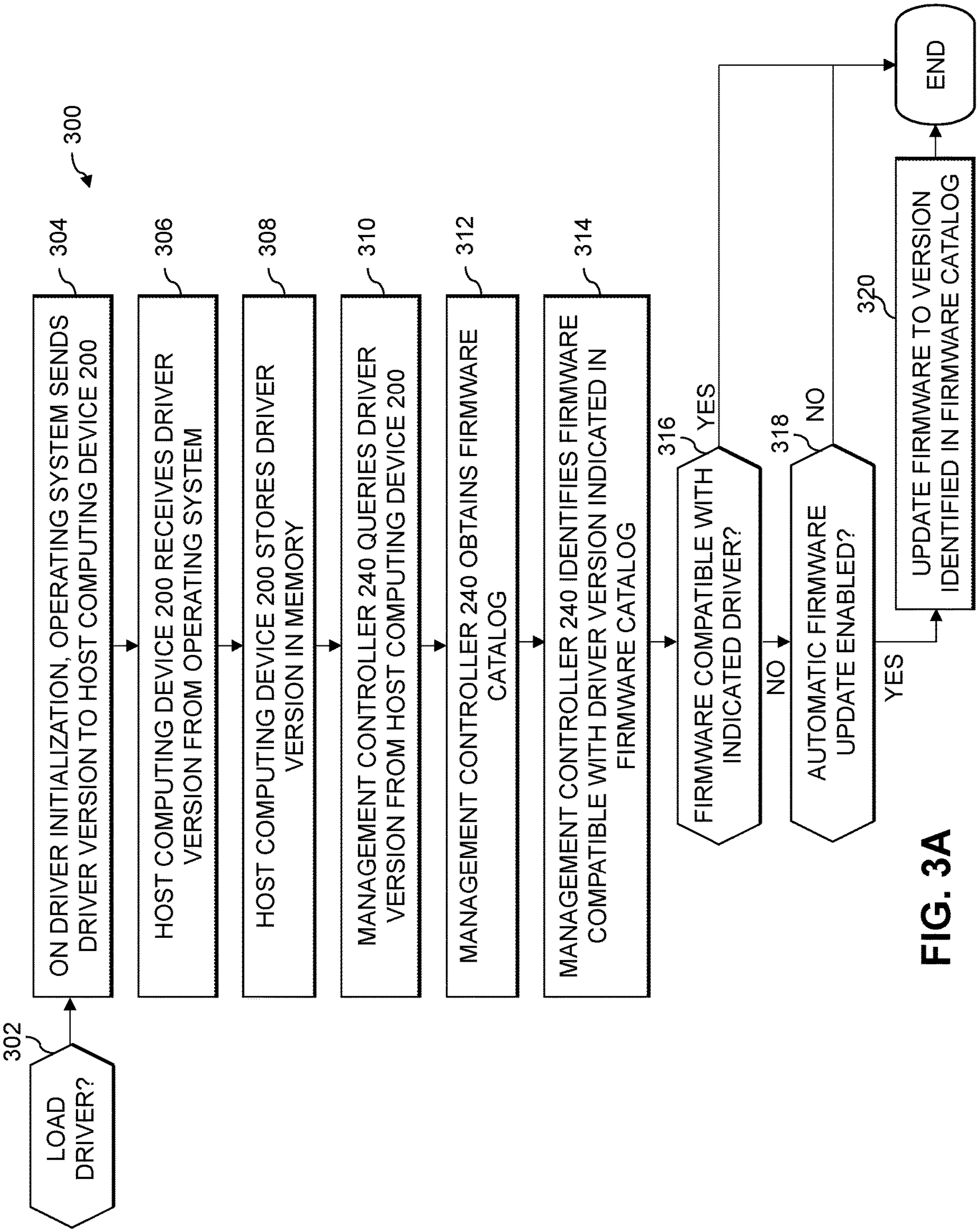
FIGS. 3A and 3B are flow charts illustrating exemplary implementations of firmware update processes in accordance with some illustrative embodiments.

FIG. 3A is a flow chart illustrating an exemplary implementation of a firmware update process 300 for an agentless approach for automated firmware updates in accordance with an illustrative embodiment. In the example of FIG. 3A, a test is performed in step 302 to determine if a driver has been loaded.

Once it is determined in step 302 that a driver has been loaded, then upon the driver initialization, the host operating system 212 sends the driver version to the host computing device 200. In step 306, the host computing device 200 receives the driver version from the host operating system 212.

The host computing device 200 then stores the received driver version in memory in step 308, for example, using an ioctl (input/output control) system call for device-specific input/output operations. In step 310, the management controller 240 queries the driver version from the memory of the host computing device 200 (e.g., using the OEM defined command for PCIe-VDM interface).

In the example of FIG. 3A, the management controller 240 then obtains the firmware catalog (e.g., from the host manufacturer catalog database 120) in step 312 and identifies the firmware in step 314 that is compatible with the driver version indicated in the firmware catalog. A firmware catalog is sometimes referred to as a solution catalog.

A test is performed in step 316 to determine if the existing installed firmware is compatible with the indicated updated driver version, as identified in the firmware catalog. If it is determined in step 316 that the installed firmware is compatible with the indicated updated driver version then program control ends.

If, however, it is determined in step 316 that the installed firmware is not compatible with the indicated updated driver version, then a further test is performed in step 318 to determine if automatic firmware updates are enabled. If it is determined in step 318 that automatic firmware updates are not enabled, then program control ends.

If, however, it is determined in step 318 that automatic firmware updates are enabled, then the firmware is updated in step 320 to the firmware version identified in the firmware catalog in step 314 before program control ends.

Figure 3B:
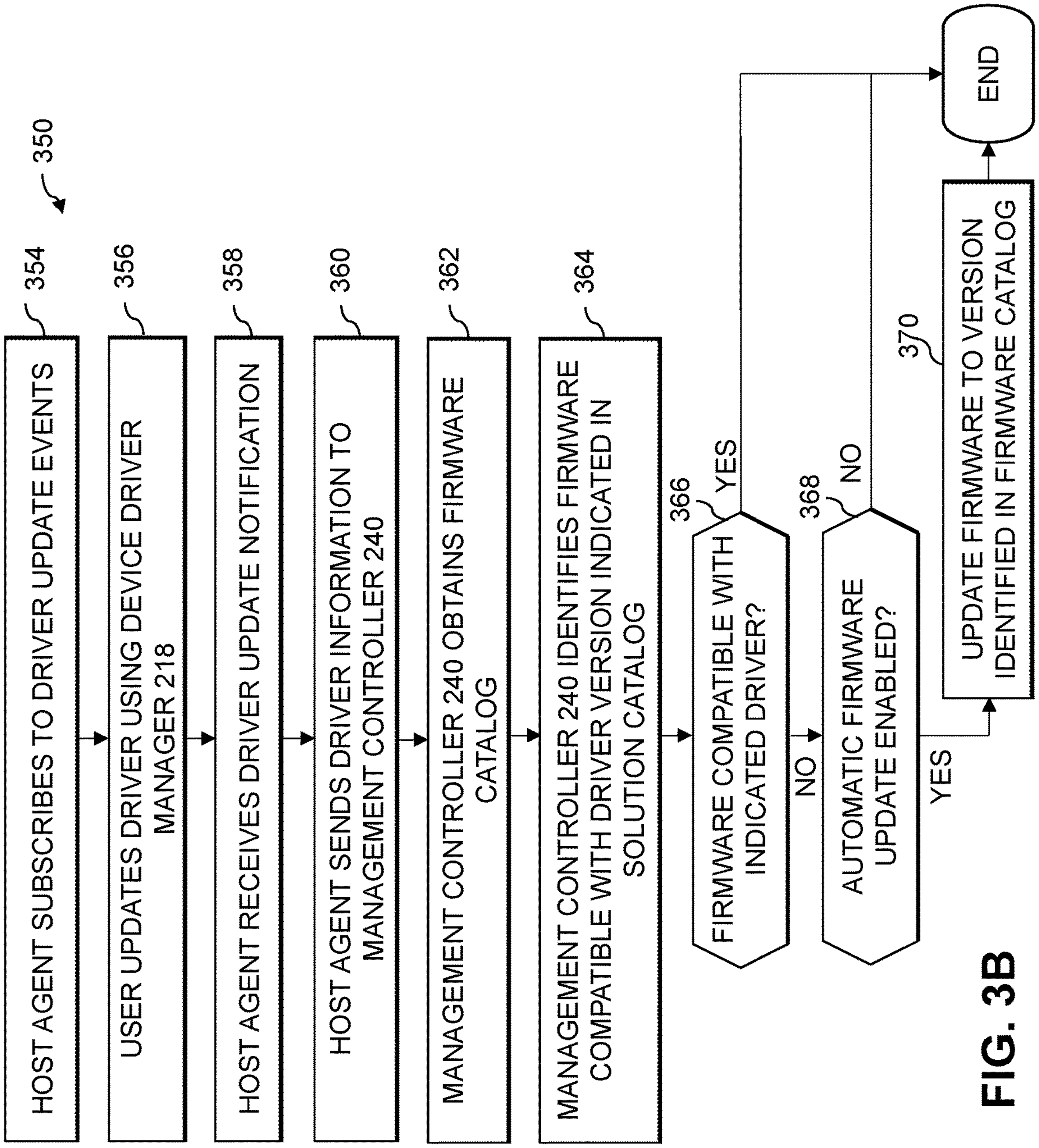

FIG. 3B is a flow chart illustrating an exemplary implementation of a firmware update process 350 for an agent-based approach for automated firmware updates in accordance with another illustrative embodiment. In the example of FIG. 3B, the MC service module 214, as the host agent, subscribes to driver update events in step 354. In step 356 the user (or a software entity on behalf of a user) updates a driver using the device driver manager 218.

In step 358, the MC service module 214, as the host agent, receives a driver update notification in response to the driver update that occurred in step 356. The MC service module 214, as the host agent, then sends the driver information associated with the notification in step 360 to the management controller 240. In step 362, the management controller 240 obtains the firmware catalog (e.g., from the host manufacturer catalog database 120) and, in step 364, the management controller 240 identifies the firmware that is compatible with the driver version, as indicated in the obtained firmware catalog.

A test is performed in step 366 to determine if the existing installed firmware is compatible with the indicated updated driver version, as identified in the firmware catalog. If it is determined in step 366 that the installed firmware is compatible with the indicated updated driver version then program control ends.

If, however, it is determined in step 366 that the installed firmware is not compatible with the indicated updated driver version, then a further test is performed in step 368 to determine if automatic firmware updates are enabled. If it is determined in step 368 that automatic firmware updates are not enabled, then program control ends.

If, however, it is determined in step 368 that automatic firmware updates are enabled, then the firmware is updated in step 370 to the firmware version identified in the firmware catalog in step 364 before program control ends.

Figure 4:
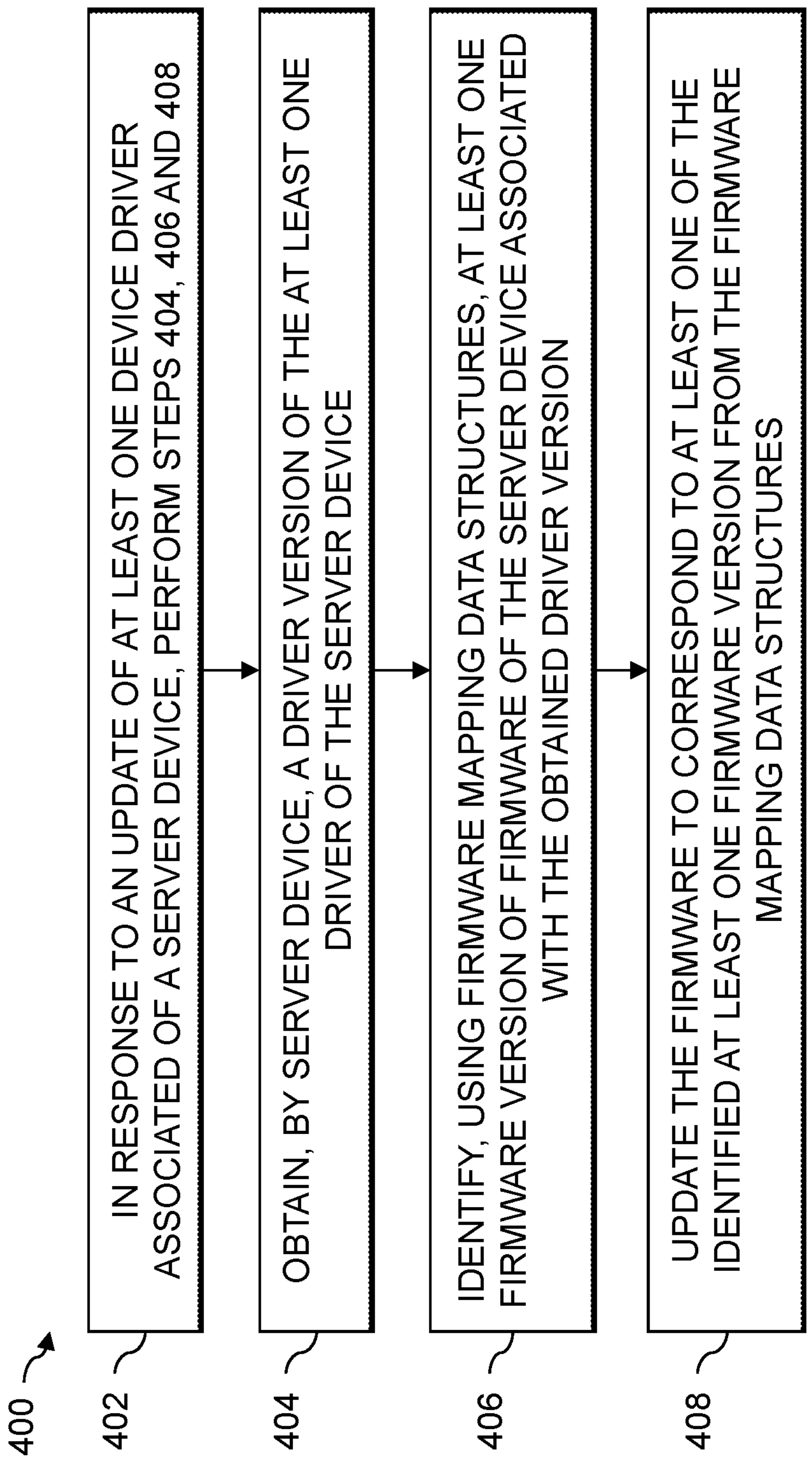
FIG. 4 is a flow chart illustrating an exemplary implementation of a firmware update process that automatically updates one or more firmware versions based on corresponding device driver versions of a server device in accordance with an illustrative embodiment.

FIG. 4 is a flow chart illustrating an exemplary implementation of a firmware update process 400 that automatically updates one or more firmware versions to correspond to device driver versions of a server device in accordance with an illustrative embodiment. In the example of FIG. 4, the firmware update process 400 performs steps 404, 406 and 408 in response to an update of at least one device driver of a server device that is detected in step 402.

In step 404, the server device (e.g., host computing device 200-A) obtains a driver version of the at least one device driver of the server device. In step 406, one or more firmware mapping data structures are used to identify at least one firmware version of firmware of the server device associated with the obtained driver version. The firmware is updated in step 408 to correspond to at least one of the identified at least one firmware version from the one or more firmware mapping data structures.

In one or more embodiments, the at least one firmware version associated with the obtained driver version further is identified by obtaining the at least one firmware version that is compatible with the obtained driver version. The obtained driver version may be obtained from a host agent associated with an operating system of the server device. The host agent may subscribe to operating system events related to updates of the at least one device driver, and the update of the at least one device driver may generate a notification of the update to the host agent.

In some embodiments, the obtained driver version is obtained from a memory of the server device, and wherein the obtained driver version is stored in the memory of the server device in response to one or more of a loading of the at least one device driver from the operating system and the update of the at least one device driver. The one or more firmware mapping data structures may comprise at least a portion of an electronically accessible firmware catalog provided by a provider of the server device.

The particular processing operations and other network functionality described in conjunction with the flow diagrams of FIGS. 3A, 3B and 4 are presented by way of illustrative example only, and should not be construed as limiting the scope of the disclosure in any way. Alternative embodiments can use other types of processing operations for automatically performing firmware updates. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for automatically updating firmware versions to corresponding device driver versions of a server device. The foregoing applications and associated embodiments should be considered as illustrative only, and numerous other embodiments can be configured using the techniques disclosed herein, in a wide variety of different applications.

Among other benefits, the disclosed techniques for automated firmware updates maintain compatibility between device drivers and their respective firmware and thereby avoid (or reduce) malfunctions associated with the computing device. For example, the disclosed firmware update techniques can detect when the latest device driver is not compatible with an outdated firmware version (or when the latest device driver is missing backward compatibility with the earlier firmware versions). Such incompatibilities may arise, for example, when the device firmware is updated to a latest version, whereas the device driver has not been updated, or when additional features and/or capabilities were added to the firmware whereas the latest device driver does not have or has not implemented an API to read or consume the latest features and/or capabilities.

One or more aspects of the disclosure recognize that firmware and device driver compatibility issues can be costly to OEMs of both hardware devices and operating systems, especially in the case of engineered solutions such as Microsoft Azure Stack Hub, Microsoft Azure Stack HCI (hyperconverged infrastructure), Microsoft S2D (Storage Spaces Direct), Extreme Scale Infrastructure (ESI) and vSAN (virtual storage area network).

It should also be understood that the disclosed firmware update techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automated firmware updates may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based firmware update engine, or portions thereof, are illustratively implemented for use by tenants of such a multi-tenant environment.

Virtual machines provided in cloud-based systems can be used to implement at least portions of a cloud-based firmware update platform in illustrative embodiments. The cloud-based systems can include, for example, object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
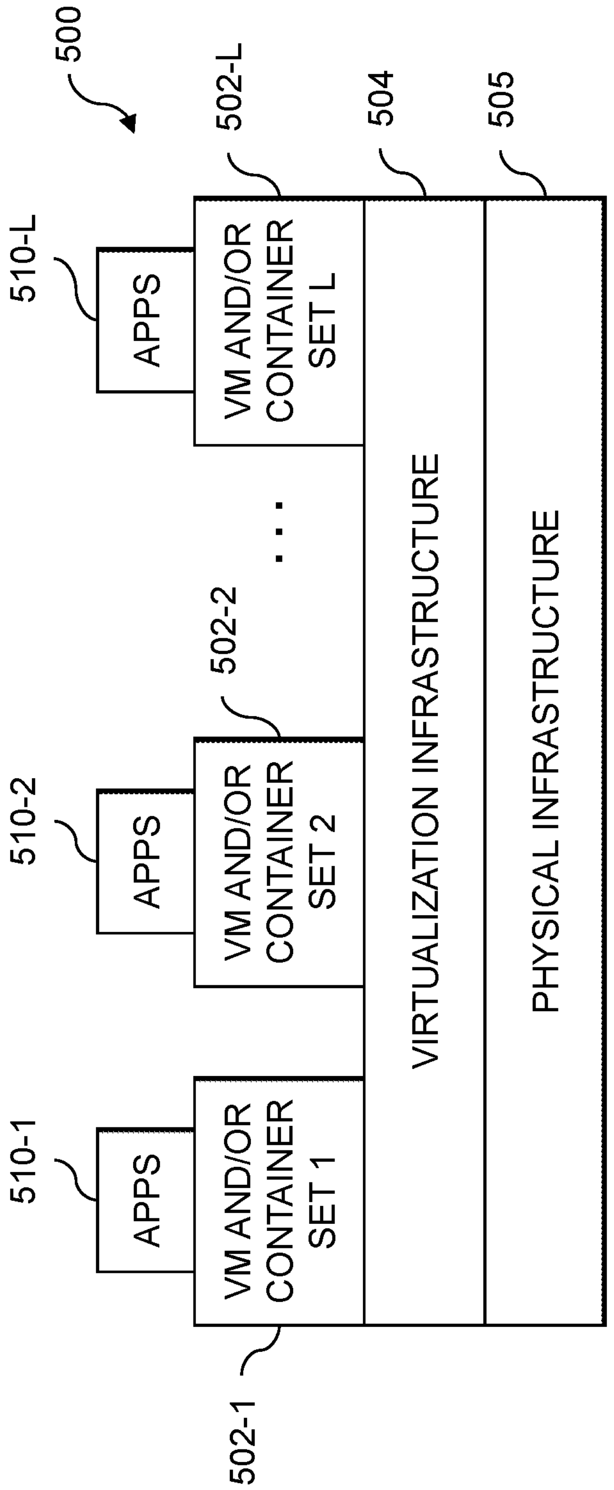
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide firmware update functionality of the type described above for one or more processes running on a given one of the VMs. For example, each of the VMs can implement firmware update control logic and firmware catalog maintenance functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide firmware update functionality of the type described above for one or more processes running on different ones of the containers. For example, a container host device supporting multiple containers of one or more container sets can implement one or more instances of firmware update control logic and associated firmware catalog maintenance functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
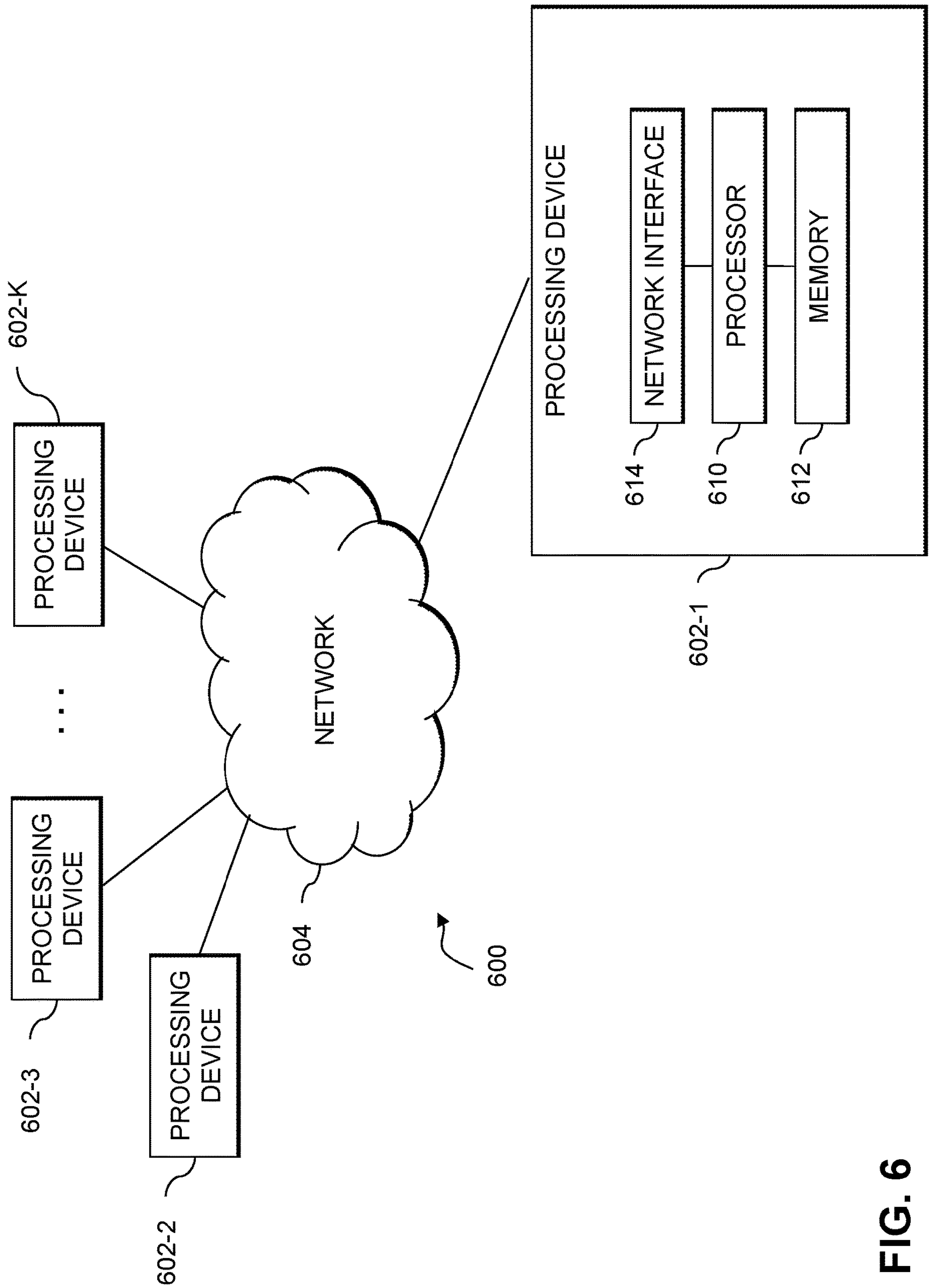
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

automatically performing the following steps in response to an occurrence of a designated event, wherein the designated event comprises an update of at least one device driver of a server device:

obtaining, by the server device, a driver version of the at least one updated device driver of the server device;

obtaining, by the server device, one or more firmware mapping data structures;

identifying, by at least one management controller of the server device, using the one or more firmware mapping data structures, at least one firmware version of firmware of the server device associated with the obtained driver version, wherein the one or more firmware mapping data structures comprise a mapping of the driver version of the at least one updated device driver to at least one corresponding version of the firmware associated with the obtained driver version; and updating, by at least one processing device of the server device, the firmware of the server device to correspond to at least one of the identified at least one firmware version from the one or more firmware mapping data structures;

wherein the at least one processing device comprises a processor coupled to a memory.

2. The method of claim 1, wherein the identifying the at least one firmware version associated with the obtained driver version further comprises obtaining the at least one firmware version that is compatible with the obtained driver version.

3. The method of claim 1, wherein the obtained driver version is obtained from a host agent associated with an operating system of the server device.

4. The method of claim 3, wherein the host agent subscribes to operating system events related to updates of the at least one device driver.

5. The method of claim 3, wherein the update of the at least one device driver generates a notification of the update to the host agent.

6. The method of claim 1, wherein the obtained driver version is obtained from a memory of the server device, and wherein the obtained driver version is stored in the memory of the server device in response to one or more of a loading of the at least one updated device driver from an operating system and the update of the at least one device driver.

7. The method of claim 1, wherein the one or more firmware mapping data structures comprise at least a portion of an electronically accessible firmware catalog provided by a provider of the server device.

8. The method of claim 1, wherein the obtaining is performed by the management controller of the server device.

9. An apparatus comprising:

at least one processing device comprising a processor coupled to a memory;

the at least one processing device being configured to implement the following steps:

automatically performing the following steps in response to an occurrence of a designated event, wherein the designated event comprises an update of at least one device driver of a server device:

obtaining, by the server device, a driver version of the at least one updated device driver of the server device;

obtaining, by the server device, one or more firmware mapping data structures;

identifying, by at least one management controller of the server device, using the one or more firmware mapping data structures, at least one firmware version of firmware of the server device associated with the obtained driver version, wherein the one or more firmware mapping data structures comprise a mapping of the driver version of the at least one updated device driver to at least one corresponding version of the firmware associated with the obtained driver version; and updating, by at least one processing device of the server device, the firmware of the server device to correspond to at least one of the identified at least one firmware version from the one or more firmware mapping data structures.

10. The apparatus of claim 9, wherein the identifying the at least one firmware version associated with the obtained driver version further comprises obtaining the at least one firmware version that is compatible with the obtained driver version.

11. The apparatus of claim 9, wherein the obtained driver version is obtained from a host agent associated with an operating system of the server device.

12. The apparatus of claim 11, wherein the host agent subscribes to operating system events related to updates of the at least one device driver, and wherein the update of the at least one device driver generates a notification of the update to the host agent.

13. The apparatus of claim 9, wherein the obtained driver version is obtained from a memory of the server device, and wherein the obtained driver version is stored in the memory of the server device in response to one or more of a loading of the at least one updated device driver from an operating system and the update of the at least one device driver.

14. The apparatus of claim 9, wherein the obtaining is performed by the management controller of the server device.

15. A non-transitory processor-readable storage medium having stored therein program code of one or more software programs, wherein the program code when executed by at least one processing device causes the at least one processing device to perform the following steps:

automatically performing the following steps in response to an occurrence of a designated event, wherein the designated event comprises an update of at least one device driver of a server device:

obtaining, by the server device, a driver version of the at least one updated device driver of the server device;

obtaining, by the server device, one or more firmware mapping data structures;

identifying, by at least one management controller of the server device, using the one or more firmware mapping data structures, at least one firmware version of firmware of the server device associated with the obtained driver version, wherein the one or more firmware mapping data structures comprise a mapping of the driver version of the at least one updated device driver to at least one corresponding version of the firmware associated with the obtained driver version; and updating, by at least one processing device of the server device, the firmware of the server device to correspond to at least one of the identified at least one firmware version from the one or more firmware mapping data structures.

16. The non-transitory processor-readable storage medium of claim 15, wherein the identifying the at least one firmware version associated with the obtained driver version further comprises obtaining the at least one firmware version that is compatible with the obtained driver version.

17. The non-transitory processor-readable storage medium of claim 15, wherein the obtained driver version is obtained from a host agent associated with an operating system of the server device.

18. The non-transitory processor-readable storage medium of claim 17, wherein the host agent subscribes to operating system events related to updates of the at least one device driver, and wherein the update of the at least one device driver generates a notification of the update to the host agent.

19. The non-transitory processor-readable storage medium of claim 15, wherein the obtained driver version is obtained from a memory of the server device, and wherein the obtained driver version is stored in the memory of the server device in response to one or more of a loading of the at least one updated device driver from an operating system and the update of the at least one device driver.

20. The method of claim 1, wherein the updating is performed by the at least one processing device of the server device in response to determining that an automatic firmware update feature is enabled.

* * * * *